United States Patent
Reddy et al.

(10) Patent No.: US 8,700,946 B2
(45) Date of Patent: Apr. 15, 2014

(54) DYNAMIC RESOURCE ALLOCATION IN RECOVER TO CLOUD SANDBOX

(75) Inventors: Chandra Reddy, San Ramon, CA (US); Enyou Li, Merion Station, PA (US)

(73) Assignee: SunGard Availability Services, LP, Wayne, PA (US)

( * ) Notice: Subject to any disclaimer, the term of this patent is extended or adjusted under 35 U.S.C. 154(b) by 328 days.

(21) Appl. No.: 13/283,173

(22) Filed: Oct. 27, 2011

(65) Prior Publication Data
US 2013/0111260 A1    May 2, 2013

(51) Int. Cl.
*G06F 11/00* (2006.01)
(52) U.S. Cl.
USPC .......................................... 714/4.11; 714/41
(58) Field of Classification Search
USPC ...................... 714/4.11, 27, 28, 41
See application file for complete search history.

(56) References Cited

U.S. PATENT DOCUMENTS

| | | | |
|---|---|---|---|
| 6,606,708 | B1 | 8/2003 | Devine et al. |
| 8,495,708 | B2 * | 7/2013 | Cohen et al. .................. 726/4 |
| 2008/0059542 | A1 | 3/2008 | Atluri et al. |
| 2009/0210427 | A1 | 8/2009 | Eidler et al. |
| 2011/0078510 | A1 * | 3/2011 | Beveridge et al. ........... 714/38.1 |
| 2011/0307735 | A1 | 12/2011 | Greenberg |
| 2012/0151270 | A1 * | 6/2012 | Stolfo et al. ................. 714/38.1 |
| 2012/0166869 | A1 * | 6/2012 | Young et al. ..................... 714/15 |
| 2012/0324281 | A1 | 12/2012 | Goroff et al. |
| 2013/0219217 | A1 * | 8/2013 | Seren et al. ...................... 714/27 |
| 2013/0305098 | A1 * | 11/2013 | Keromytis et al. .......... 714/38.1 |

FOREIGN PATENT DOCUMENTS

EP    1056011 A2    11/2000

OTHER PUBLICATIONS

Combined Search and Examination Report under Sections 17 and 18(3) mail date Mar. 27, 2013 for UK Application No. GB1219299. filed on Oct. 26, 2012 for SunGard Availability Services, LP entitled Dynamic Resource Allocation in Recover to Cloud Sandbox, 5 pages.

* cited by examiner

*Primary Examiner* — Marc Duncan
(74) *Attorney, Agent, or Firm* — Cesari and McKenna, LLP (57) ABSTRACT

A recover to cloud (R2C) service replicates a customer production environment to virtual data centers (VDCs) operated in a cloud service provider environment. Customers provision both a disaster recovery VDC and a test VDC. At A Time of Disaster (ATOD), the disaster VDC is made available to the customer through the cloud. The disaster VDC is allocated a first set of resources dedicated to the specific customer and to disaster recovery. The test VDC, brought on line at A Time of Test (ATOT), is allocated resources from second set of resources arranged in a shared pool, separate from the first set. Provisioning of the test VDC does not disturb critical resource assignments needed in the event of a disaster.

17 Claims, 5 Drawing Sheets

DYNAMIC RESOURCE ALLOCATION IN RECOVER TO CLOUD SANDBOX

BACKGROUND

Replication of data processing systems to maintain operational continuity is now required almost everywhere. The costs incurred during downtime when information technology equipment and services are not available can be significant, and sometimes even cause an enterprise to halt operations completely. With replication, aspects of data processing machines that may change rapidly over time, such as their program and data files, physical volumes, file systems, etc. are duplicated on a continuous basis. Replication may be used for many purposes such as assuring data availability upon equipment failure, site disaster recovery or planned maintenance operations.

Replication may be directed to either the physical or virtual processing environment and/or different abstraction levels. For example, one may undertake to replicate each physical machine exactly as it exists at a given time. However, replication processes may also be architected along virtual data processing lines, with corresponding virtual replication processes, with the end result being to remove the physical boundaries and limitations associated with particular physical machines.

Use of a replication service as provided by a remote or hosted external service provider can have numerous advantages. Replication services can provide continuous availability and failover capabilities that are more cost effective than an approach which has the data center operator owning, operating and maintaining a complete suite of duplicate machines at its own data center. With such replication services, physical or virtual machine infrastructure is replicated at a remote and secure data center.

In the case of replication services to virtual target, a virtual disk file containing the processor type and configuration, operating system, data, and applications for each data processor in the production environment is created and retained in a dormant state. In the event of a disaster, the virtual disk file is moved to a production mode within a Virtual Data Center (VDC) environment at the remote and secure data center. Applications and data can then be accessed on the remote VDC, enabling the service customer to continue operating from the cloud while recovering from a disaster.

From the perspective of the service customer, the replication service provider thus offers a Recover to Cloud (R2C) service that is provided much like an on-demand utility (much like the electricity grid) over a network (typically the Internet). This enables a data center operator to replicate critical servers and applications in his production environment to the cloud, with the VDC environment being activated to bring up the corresponding virtual machines and applications via the cloud in the event of a disaster.

SUMMARY OF PREFERRED EMBODIMENTS

This disclosure concerns a recover to cloud (R2C) virtual data center (VDC) that replicates a customer production environment to a service provider environment that provisions a dedicated disaster VDC and a test VDC. At A Time of Disaster (ATOD) event, the disaster VDC is brought online and made available via the cloud to the customer. The disaster VDC is pre-allocated with resources such as firewalls, Virtual Local Area Network(s) (VLANS), network bandwidth, storage devices, and other resources needed from a pool of shared resources.

The test VDC, brought on line at A Time of Test (ATOT), is provisioned as a replica of the disaster VDC. However, the test VDC is allocated resources from second, shared resource pool that does not disturb mission critical resource assignments (such as firewall and VLANs) needed by the disaster VDC.

With this arrangement, a disaster recovery service customer can now keep their production environment up and running while using the test VDC for testing the viability of their Recover to Cloud (R2C) configuration and other scenarios.

More particularly, the disaster VDC, typically implemented operated by a replication service provider, is provisioned as a replica of the service customer's production environment. Live agent software continuously captures data changes in the customer's production environment and copies them to the disaster VDC. The live agents may run within the customer production environment or within the service provider's environment.

The disaster VDC may include dormant Virtual Machine (VM) definition files, applications, storage elements, and security and network elements. Certain network infrastructure elements such as VLANs, firewalls, VMware port groups, Internet Protocol (IP) addresses, and other resources needed to operate the service customer's failed over production environment.

These elements supporting the disaster VDC are assigned from a set of resources maintained by the service provider that are dedicated only to a specific customer's disaster VDC. Although these dedicated resources remain unused until a failover event occurs, this permits the disaster VDC to go live as quickly as possible, by promoting them to a live VM, accessible to the customer remotely and securely.

However, many customers wish to test out recovery scenarios before a disaster actually happens. When the R2C service customer requests testing their configuration, a second VDC is provisioned by the replication service provider. At Time Of Test (ATOT) the customer's VMs and, other needed elements are copied or, preferably, moved from the disaster VDC to the test VDC. Test VDC elements such as firewalls and VLANs needed to go live are allocated from a shared pool and are not taken from the set of elements dedicated to the disaster VDC.

Once testing is completed the test VDC is deactivated, and the network elements are released back to the shared pool. These can now be used to instantiate other test VDCs for other customers, or for their other, non-critical purposes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EXAMPLE EMBODIMENTS

Figure 1:
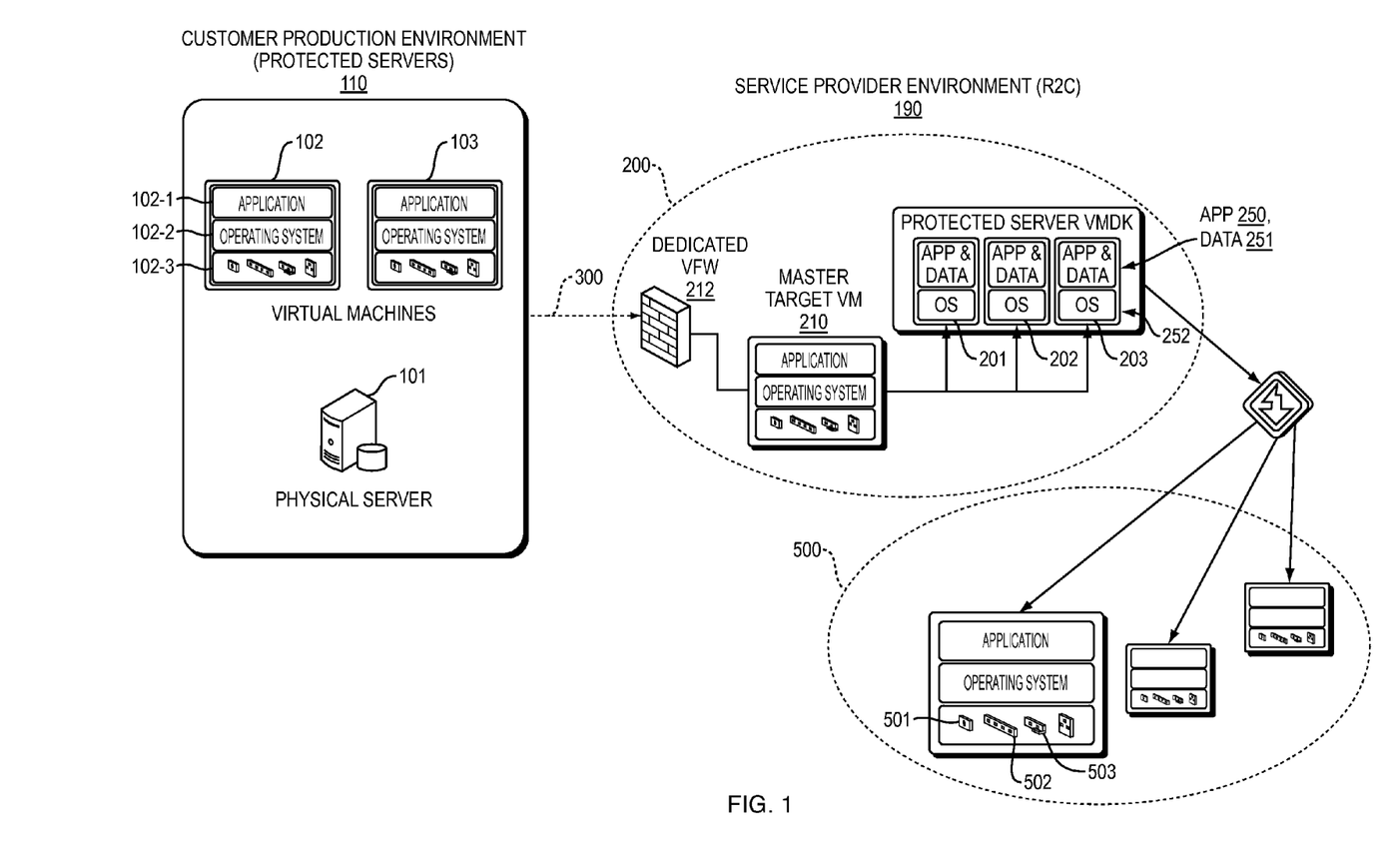
FIG. 1 illustrates a Virtual Data Center (VDC) that provides a Recover to Cloud (R2C) service to a customer operating one or more physical or virtual data processors in a production environment.

FIG. 1 is a high level block diagram of an environment in which apparatus, systems, and methods for resources needed for a sandbox testing environment are allocated from a pool that is separate from a pool of resources dedicated to a Recover to Cloud (R2C) environment.

As shown, a production side environment 110 (that is, the customer's side from the perspective of a replication service provider) includes a number of data processing machines such as servers 101, 102 . . . 103. The production servers may be physical machines 101 or virtual machines (VMs) 102, 103.

The production servers 101, 102, . . . , 103 may implement any sort of data processing function, such as a web server, database server, application server, media server, etc.—the specific end use of the servers is typically not important here. An example production server 102 does usually have one or more application programs 102-1, operating systems 102-2, and other data processor components 102-3 such as memory, local storage, etc.

Each of the production servers 101, 102, . . . , 103 may include a respective agent process that performs replication operations. The agents may operate independently of the production servers in a preferred embodiment but may also be integrated into an application or operating system level process or operate in other ways. The replication agents detect changes in the production environment and report them to the remote service provider environment.

More specifically, the production servers 101, 102, . . . , 103 are connected to a wide area network (WAN) connection 300 such as provided by the Internet, a private network or other network to a replication service environment 190 that provides one or more Virtual Data Centers (VDCs) 200. The service customer does not really care where or how the VDCs 200 are implemented, and so from the customer's perspective, they are located at the service provider environment 190 and accessible in the cloud somewhere to provide a Recover to Cloud (R2C) service.

In such a virtualized computing environment with virtual machines operating in a cloud infrastructure, multiple computation stacks, including operating system, middleware, and applications, can operate together in a single server or set of servers. The cloud system(s) are therefore virtualized environments where virtual machines can elastically and dynamically scale to match the load or performance demands, where access to the cloud service is through a public network, and where the number and capability of virtual machines can be measured by the cloud provider and made available to the specifications of the customer using the cloud according to Service Level Agreements or other contractual arrangements.

In a typical scenario, each VDC 200 includes a dedicated virtual firewall 212, some specific VLANs, a dedicated storage LUN, a dedicated live virtual machine called a replication update VM (RU VM) 210 and a number of dormant virtual machines (VMs) 201, 202, . . . , 203. This VDC 200, referred to as the disaster VDC herein, has a purpose of replicating the customer's production environment 110 such that it may be brought on line and active in the event of a disaster at the customer environment 110.

An example dormant VM includes at least an application, data, and an operating system, however other elements may also be defined.

The replication agents mentioned above provide a number of functions such as encapsulation of system applications and data running in the production environment 110, and continuously and asynchronously backing these up to target disaster VMs in the VDC 200. More specifically, the replication agents are responsible for continuously replicating the customer's virtual and/or physical configurations to one or more virtual machine (VM) definition files 201, 202, 203, such as, but not limited to, VMware Virtual Machine Disk (VMDK) Amazon AMI, Microsoft VHD, or other suitable formats. At a time of disaster, the VM definition files 201, 202, 203 are transferred to on-demand active servers in the failover environment 500 allowing the customer access through a secure network to their replicated environment. The specific mechanism(s) for replication and disaster recovery are not of particular importance to the present disclosure. It should also be understood that there may be a number of additional data processors and other elements of a commercial replication service such as recovery systems, storage systems, monitoring and management tools that are not shown in detail in FIG. 1, which are not needed to be specified in detail to understand the present embodiments.

As shown, a data processor serving as a dedicated live VM 210 receives the replicated data from the agents running in the production environment. This replication update VM (RU VM) 210 writes the replicated data to the dormant VM definition files as changes occur in the production environment 110.

As mentioned above, an example VM definition file 201, 202, . . . , 203 specifies application programs 250, data 251, and an operating system 252. However, additional elements are required for each replicated dormant VM to be activated in the failover environment 500. These may include specific storage elements 501, network elements 502, security elements 503, and other elements that correspond to infrastructure and/or hardware that are necessary to actively operate the VMs such as VLAN IDs, firewalls, port groups in a VMware based environment, or other resources necessary to implement each VDC.

In the customer's production environment 110, connections between data processing machines 101, 102, 103 are typically made over a Local Area Network (LAN) in a trusted location that allows direct addressing using local IP addresses. However, it is increasingly common for production environments to provide connections between machines in disparate locations over a wide area network (WAN) where the connections themselves may not be trusted and public IP addressing may be required. Establishing environments that require communicating though the WAN to another system in a separate LAN thus involve consideration of security and address translation issues. These issues are typically addressed through the use of VPNs (Virtual Private Networks) using IP Security (IPsec) or Secure Socket Layer/ Transport Layer Security (SSL)/TLS for security and encryption. These secure VPN connections further require encryption and authentication keys that are negotiated in a key exchange, as per the Internet Key Exchange (IKE) standard or SSL/TLS. The disaster recovery environment thus typically implements dedicated firewalls and VLANs (and perhaps other resources) for each customer's disaster VDC 200. This customer's VDC 200 is also given a permanent communication channel 300 back to the customer's production network 110 for passing the server replication traffic. The disaster VDC 200 is used both to guarantee prompt responses to customers' disasters and for testing disaster configurations as well.

Therefore, to support replication of such production environments, these specific additional communication resources include items such as firewalls, VLANs, VMware port groups, encryption and authentication keys.

In the event of a disaster, the dormant VM specified by the respective VM definition files 201, 202, . . . , 203 are promoted to live VMs and access is provided to the customer in a replicated failover environment 500 via connections to the cloud. For these activated VMs, the service provider provides public IP addresses for those VMs which are public internet facing, and may also provide multiple VLAN IDs for the failed over VMs, and may also provide another dedicated resources such as a virtual firewall to support, for example, VLANs behind which the failed over virtual machines exist.

Figure 2A:
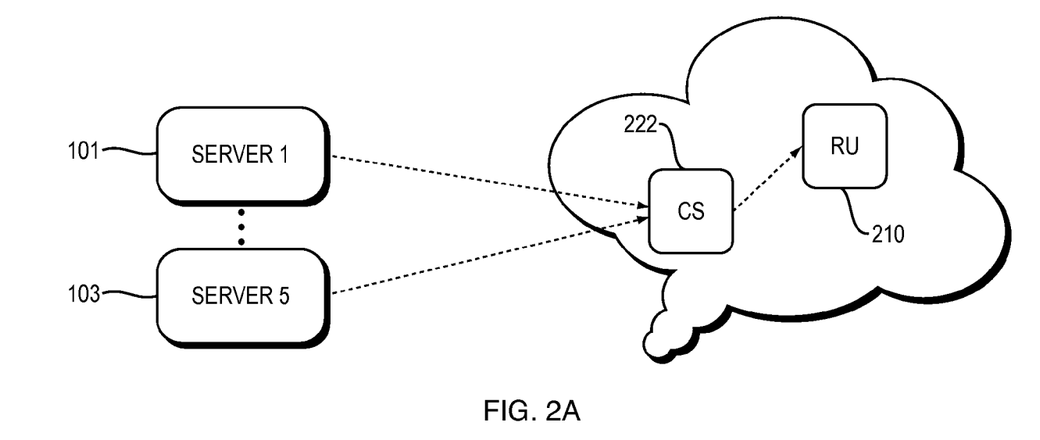
FIGS. 2A and 2B illustrate replication process scenarios.

FIG. 2A illustrates one way to implement the replication processes in more detail. Any changed data is tracked on production servers 101, 102, 103 by a driver or other agent as mentioned above. When the change rate is relatively low and the number of servers protected is less than a certain number, the change data is compressed at the production side and pushed over the WAN 300 to the CS 222, instantiated as a live VM in the cloud. The CS 222 then pushes updated data to a replication update (RU) VM 210. The RU VM 210 then writes data to the appropriate dormant VM definition files 201, 202, . . . , 203. The RU VM 210 may also do a copy on write to continuous data protection (CDP) journals.

Figure 2B:
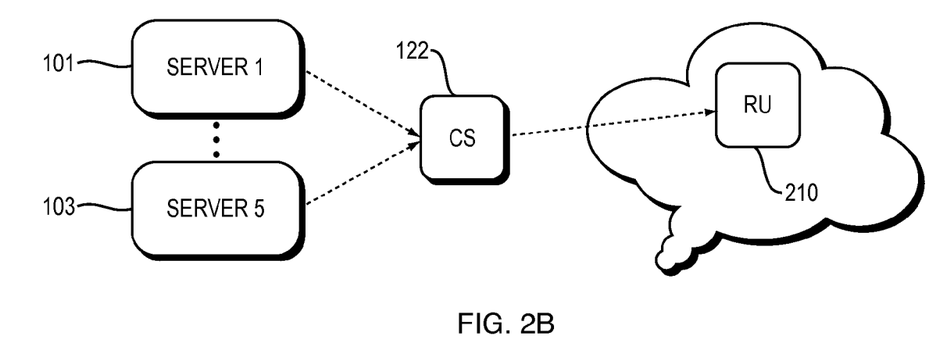

This process however can, in some instances, strain CPUs on the production servers 102, 103 at the customer environment 110 because of the need to implement compression on the production servers 101, 102, 103. Thus, in another scenario shown in FIG. 2B, the CS 122 is instead located at the customer side of the WAN. In this scenario, change data is again tracked on the production side by an agent or driver. However, when the change rate becomes higher or the number of servers is more than a certain amount, with the caching server (CS) 122 now preferably placed in the customer environment 110, the change data on the production server can be sent to the CS 122 without compression, over its local network at high local area network speeds. CS 122 in this embodiment can either be a virtual machine or a physical server. The CS 122 then compresses the data and pushes change data to the replication update virtual machine (RU VM) 210 over the WAN 300 with optional bandwidth shaping. The RU VM 210 can then write the data to dormant VM definition files as in the FIG. 2A case and/or do a copy on write to CDP journals, continuous real time backup or other schemes that are automatically save and copy every change made to a system's data.

Figure 3:
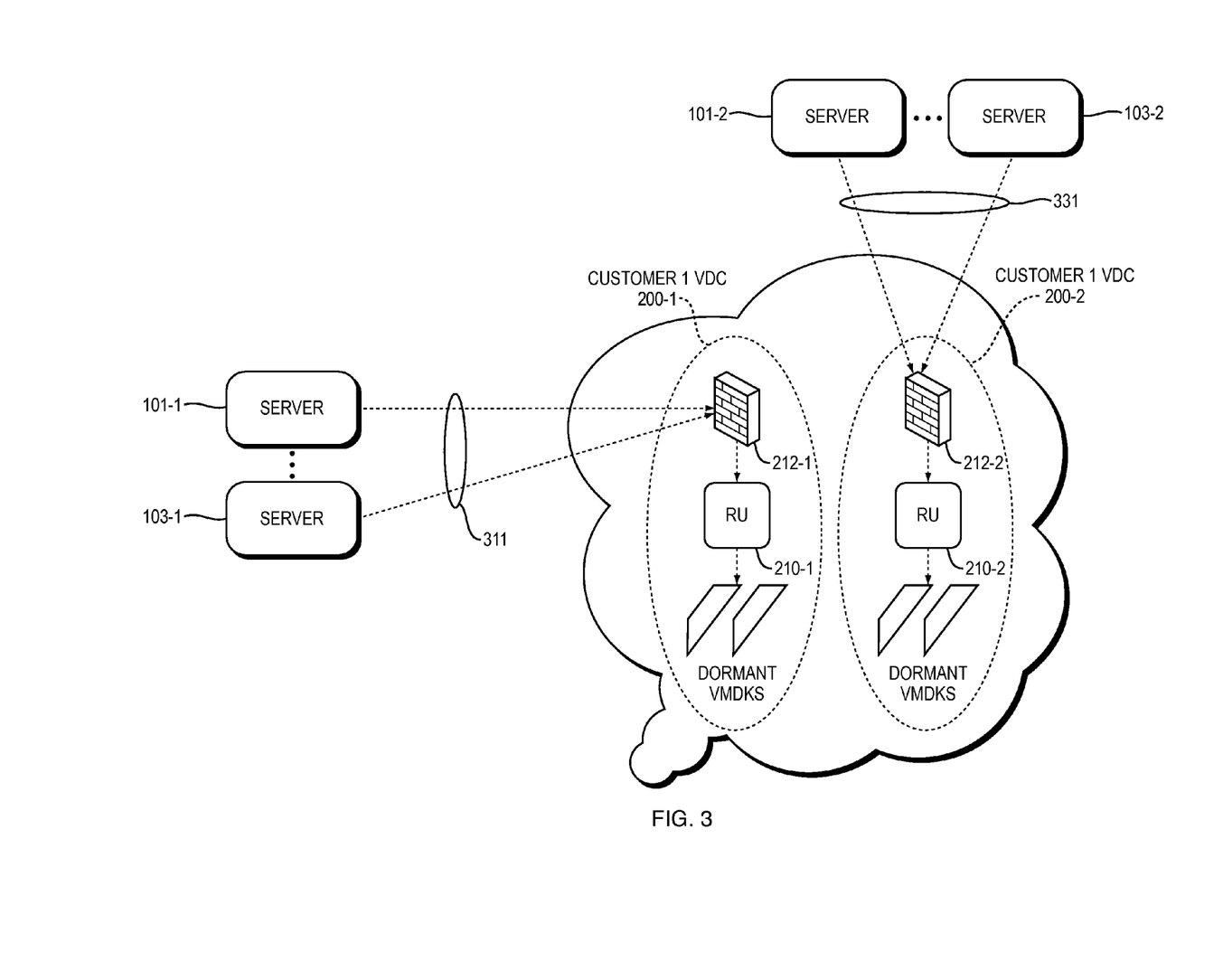
FIG. 3 illustrates R2C security.

With attention now to FIG. 3, it can be seen that a first disaster VDC 200-1 supported by the service provider looks like a remote office network replicating its machines 101-1, 102-1, . . . , 103-2 and serving as a high availability solution via secure IPsec VPN tunnel(s) 311. Other customers, such as Customer 2 also have their own second disaster VDC 200-2 accessible via other secure VPN tunnel(s) 333 to replicate their own machines 102-1, . . . , 102-3. At a network layer 2 inside the R2C infrastructure, an R2C customer (such as Customer 1) is therefore separated from the other R2C customers (such as Customer 2) by running them on separate VLANs. At a network layer 3 inside the R2C infrastructure, every R2C customer is further securely protected from one another by dedicated firewalls 212-1, 212-2.

Figure 4:
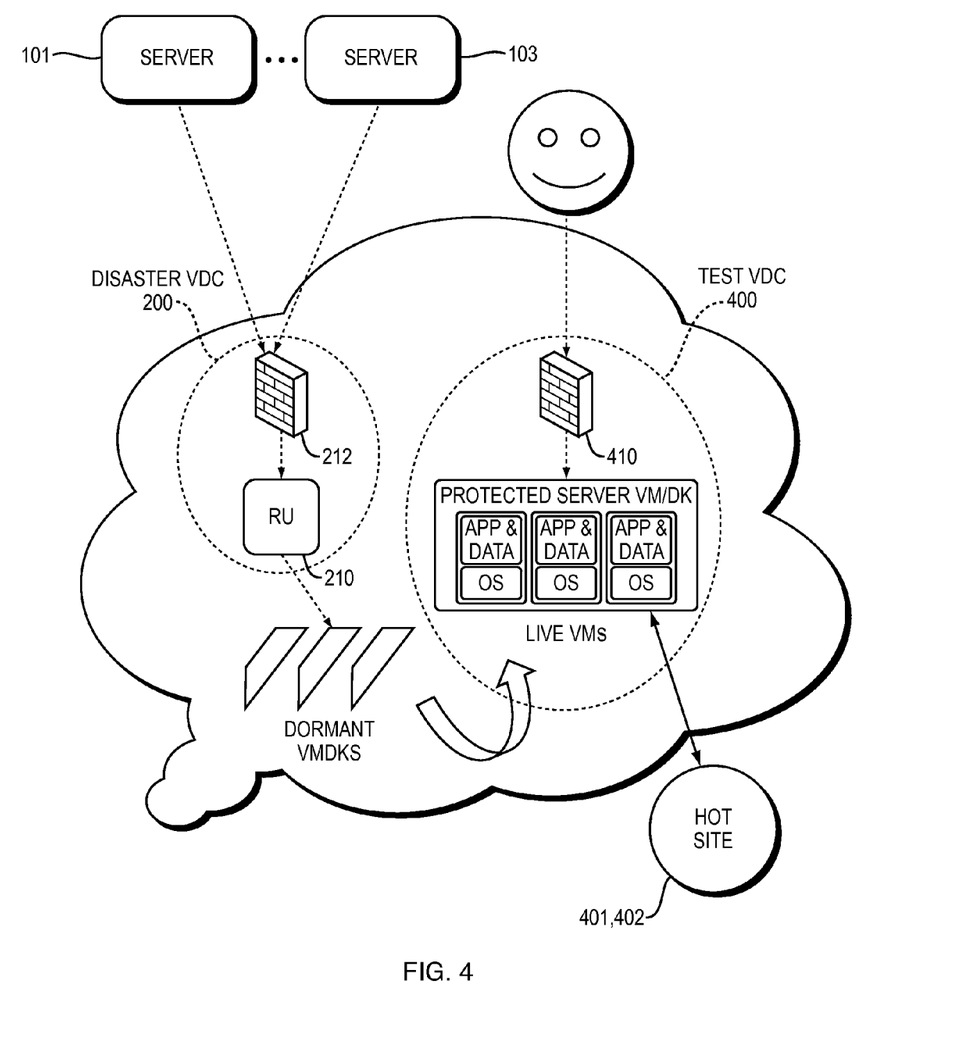
FIG. 4 is a high level diagram of a test VDC used for sandbox testing of the R2C configuration.

Turning attention to FIG. 4, according to specific embodiments herein, a second VDC 400 is also created for a given customer. This second VDC 400 is used for failover sandbox testing and is referred to herein as a test VDC 400. When the customer requests provisioning of this test VDC 400, it is created by copying or moving the protected server VM definition files 201, 202, 203 over from the disaster VDC 200. When it is desired to go live with the test VDC specification, the service provider also allocates necessary resources 401, 402, . . ., etc. to them as needed, as will be understood shortly.

These resources need to support the test VDC 400 are allocated differently from the resources allocated for activating the disaster VDC 200 as was described in FIG. 1. In particular, resources required to bring the test VDCs 400 online are allocated from a pool of resources that are shared and dynamically allocated among requesting customers on demand. This permits the shared resource pool to service many different customers to create test VDCs 400. This is unlike the allocation strategy adopted for the elements needed by the disaster VDCs 200, where these critical and necessary resources are allocated on a permanent basis, to be ready immediately upon on demand.

The assigned test VDCs 400 have no communication channel back to the customer's production environment 100 so they will never interfere with operation of the customer's production system(s) 101, 102, 103.

However, precautions should also be taken to avoid any split brain problems with network identities and addresses, so that a test VDC 400 is always brought online with different identifiers and addresses than its corresponding disaster VDC 200. For example, at an ATOT event, when the dormant VM definition files 201, 202, 203 are moved from the disaster VDC 200 to the test VDC 400, they are brought online with different VLAN IDs, firewall IDs, VMware port groups, IP addresses etc., and any other parameters, functions, or instrumentalities needed to ensure that the two VDCs have different network personalities when they go live.

Thus provided here is a way to bring up the test environment into the cloud with a different ID and on a different network so that the customer can host a replica of its production environment, and run tests on it without shutting down the production environment, and while at the same time without affecting the critical availability of the resources needed to bring the disaster VDC 200 on line as well.

The different network IDs involve one or more modified IP addresses, subnet masks, DNS servers and any other modifications necessary so that the new virtual machines can come alive in a test VDC 400 sandbox without affecting the production environment 110 or the disaster VDCs 200. This permits the customer to test failover scenarios within the cloud virtual machine setup as well as other testing scenarios such as rolling out new applications, antivirus, software, security, new versions of applications, different backup strategies and so forth in a sandbox environment.

As also shown in FIG. 4, the test VDC 400 has no connection back to the customer's office network and thus does not interfere with the production network.

The basic idea here is that prior to ATOT, a virtual firewall is provisioned, as well as required number of VLANs, and any other resources such as firewall policies and the like that will be failed over to support the test VDC 400 going live. When a test is triggered, the dormant VM definition files in test VDC 400 go live behind a newly instantiated virtual firewall in the test sandbox provided by the service provider environment 190 in the cloud. The VMs are assigned current IP addresses, VLANs and port groups. Once failover test VDC is instantiated, the customer can then use a VPN client to connect to the test sandbox environment, such as via remote desktop protocol (RDP) and perform his desired testing. The customer can also choose to test operating system service pack upgrades and discard changes at the end of testing enabling replication again. The failed over VMs can also connect to other hot sites or other work groups as indicated by 401, 402. This further connectivity becomes important for those customers who also have to recover some of their servers by other means such as by recovery from tapes, or disks in other remote data centers not directly provided at the disaster recovery service provider location 190. These hot sites may be implemented on any suitable server platform such as IBM AS 400, Sun/Oracle Solaris, AIX, Hewlett Packard HP UX, etc. for providing recovery from tapes or disk or other backup media. These other platforms may or may not be physically located in the same data center as the disaster VDC 200.

Figure 5:
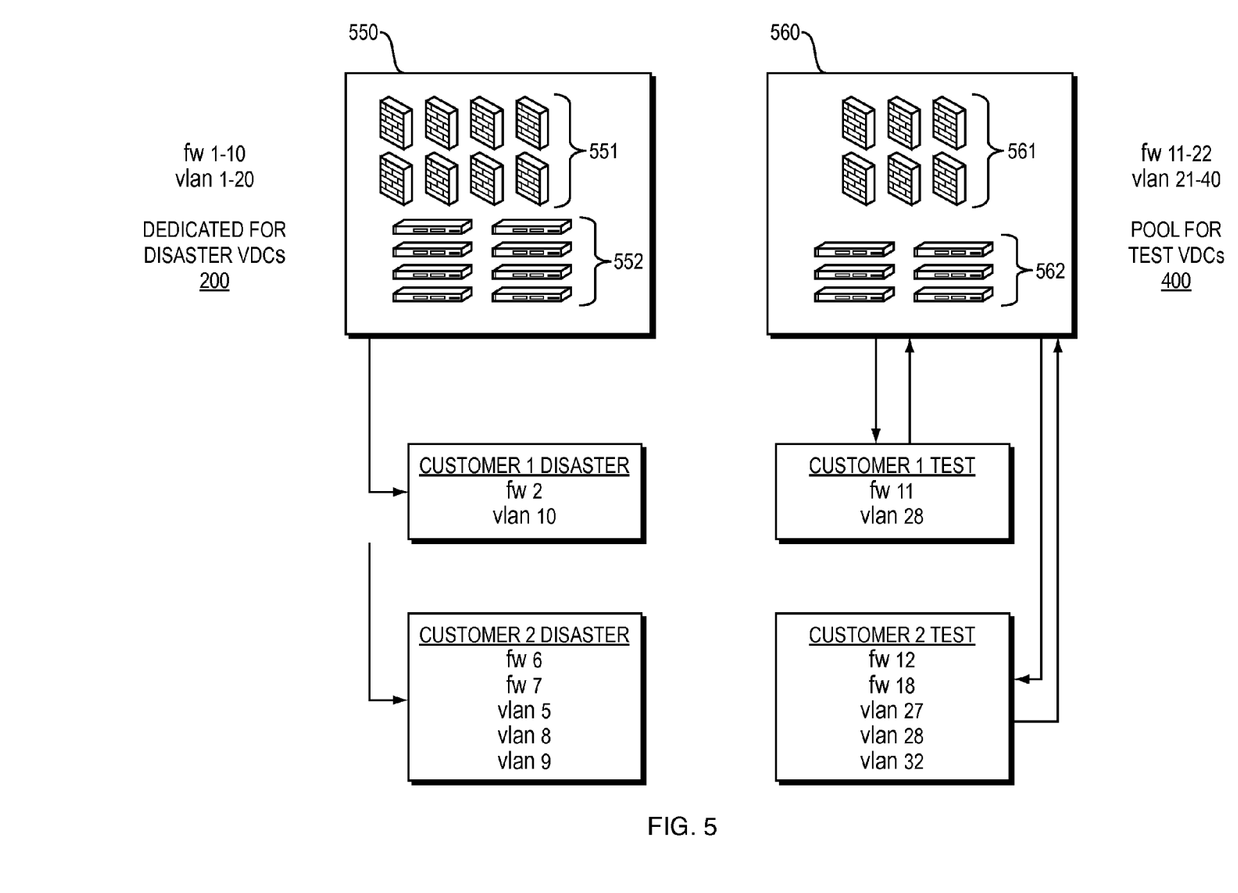
FIG. 5 illustrates resources dedicated for disaster VDC services but pooled for is test VDCs.

FIG. 5 illustrates the allocation of resources to both the disaster VDC 200 and test VDC 400. As shown on the left hand side, a first set of resources 550 includes a first set 551 of firewalls FW 1-10 and a first set 552 of VLANs 1-20. The first set of resources 550 are dedicated solely to the disaster VDC 200 functionality for specific customers.

A second set of resources 560 provides a shared pool of firewalls 561 and VLANs 562. These specifically include firewalls 11-22 and VLANs 21-40 to be are used by various customer's test VDCs 400.

In one example, a Customer 1 has provisioned a firewall FW 2 and a VLAN 10 and these are allocated from the disaster resource pool 550 for this disaster VDC 200-1.

Customer 2 provisions for his environment a disaster VDC 200-2 that requires two firewalls, FW 6 and FW 7, and three VLAN IDs, VLAN 5, VLAN 8 and VLAN 9. These assignments of firewalls and VLANs to the disaster VDCs is on a permanent basis and mutually exclusive. This enables rapidly bringing live a replicated customer environment in the event of a disaster.

The resources needed for bringing the test VDCs 400 on line are allocated from the second set 560 of pooled resources. Here Customer 1 has requested a test VDC 400-1 that will need a single firewall and a single VLAN. These are allocated from the pool on the right hand side. So, for example, when the customer 1 test VDC 400-1 is brought on line, firewall 11 and a VLAN 28 are allocated from the shared pools 561, 562. These resources remain allocated to the customer 1 test VDC sandbox until Customer 1 completes his testing.

In a subsequent event, Customer 2 requests a test VDC 400-2 to go live. This customer needs two firewalls and three VLANs. Customer 2 gets to reuse firewall 11 and VLAN 28 that were previously allocated to Customer 1 from the pools 561, 562.

These shared resources in the pools 561, 562 become accessible via a virtual private network using different secret keys for each test VDC customer so that even though the same virtual or physical machine implements subsequent firewall 11 for example, it will be securely accessed by the subsequent customer.

With this arrangement, when a disaster occurs, new VLANs and/or firewalls need not be allocated as they will already have been dedicated from the disaster pool 550. However, the customer need not pay for and the service provider need not provision on a permanent basis less critical resources such as VLANs and/or firewalls for test purposes, those being allocated from a much smaller pool. Thus, by creating a pool of VLANs and firewalls and allocating those resources only as a customer schedules a disaster recovery test more efficient use of resources in the cloud is achieved. This more economical arrangement still provides full security. Whether a VDC is assigned to a customer as a disaster VDC 200 or a test VDC 400, it is fully isolated from other customers' VDCs at the service provider's R2C environment 190 by their own virtual firewall(s), VLANs, and other security measures.

The teachings of all patents, published applications and references cited herein are incorporated by reference in their entirety.

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A data processing system for replication of a production data processing environment operated by a customer, the production environment including at least one production data processor and at least one production networking device, the system comprising:
   (a) a disaster virtual data center (VDC) including at least one dedicated live virtual machine (VM), at least one dedicated replication networking device, and one or more dormant VM definition for storing replicated data received from the production environment;
   (b) a test virtual data center (VDC) including provisions for allocating a networking and security device on demand from a pool of networking devices;
   (c) a failover process comprising:
      a replication process for receiving replicated data from the production system and writing the replicated data to the dormant VM in the disaster VDC, while the production system is in operation;
      a failure recovery process for activating the disaster VDC for access by the customer in place of the production system by promoting the dormant VM to a live VM when the production system fails; and
   (d) a testing process comprising:
      a sandbox test process for (i) moving or copying the first dormant VM from the disaster VDC to the dormant second VM in the test VDC; (ii) promoting the second dormant VM to a live VM within the test VDC; (iii) allocating a networking device on demand from a pool of networking devices reserved for sandbox testing; (iv) activating the test VDC for access by the replication service customer while the production system is still operating; and (v) releasing the networking device to the pool when the sandbox test process is finished.

2. The system of claim 1 wherein the networking devices are at least one of firewalls or VLANs.

3. The system of claim 1 wherein the service customer accesses the test VDC using network device identifiers that do not conflict with network device identifiers allocated to the production system.

4. The system of claim 1 wherein the replication process also supports failure recovery and sandbox test processes for a second customer, and the sandbox test process for the second customer allocates a same networking device from the pool that was earlier allocated to and then released by the first customer.

5. The system of claim 1 wherein the sandbox testing process further tests at least one of production system failover scenarios, roll out of new applications and services, different backup scenarios, or stress testing.

6. The system of claim 1 wherein once a VDC is assigned to a customer as a disaster or test VDC, it is isolated from other customers' VDCs at the service provider environment by its own virtual firewall and other security measures.

7. The system of claim 1 wherein the pool of networking devices reserved for sandbox testing does not include the dedicated networking device assigned to the disaster VDC.

8. The system of claim 1 wherein the failover process further comprises:
   an allocation process for allocating network and firewall resources to connect the failed over live VMs to other recovered servers located within the same or a different data center as the disaster VDC.

9. A method for recovering a production system comprising:
   (a) replicating the production system with a disaster virtual data center (VDC) including at least one live virtual machine (VM) having a secure connection through at least one networking device dedicated to the disaster VDC, and a first dormant VM definition, for storing replicated data received from the production system while the production system is in operation;
   (b) maintaining a test virtual data center (VDC) definition including at least a second dormant VM definition;
   (c) recovering from a disaster event by activating the disaster VDC for access by the replication service customer in place of the production system by promoting the first dormant VM definition to a live VM when the production system fails; and
   (d) testing recovery of the production system in a sandbox by:
      (i) moving or copying the first dormant VM from the first dormant to the second dormant VM in the test VDC;
      (ii) promoting the second dormant VM to a live VM within the test VDC;
      (iii) allocating a networking device on demand from a pool of networking devices reserved for sandbox testing;
      (iv) activating the test VDC for access while the production system is still operating; and
      (v) releasing the networking device to the pool when the sandbox testing step is finished.

10. The method of claim 9 wherein the networking devices are at least one of firewalls or VLANs.

11. The method of claim 9 wherein the test VDC uses network device identifiers that do not conflict with network device identifiers allocated to the production system.

12. The method of claim 9 further comprising recovering and testing recovery steps for a second customer, and the testing recovery step for the second customer allocates a same networking device from the pool that was earlier allocated to and then released by the first customer.

13. The method of claim 9 wherein the testing recovery step further includes testing to at least one of a production system failover scenario, roll out of new applications and services, different backup scenarios, or stress testing.

14. The method of claim 9 wherein the dormant VM definition is a VMDK-compatible file.

15. The method of claim 9 wherein once a VDC is assigned to a customer as a disaster VDC or test VDC, it is isolated from other customers' VDCs by at least a virtual firewall and one other security measure.

16. The method of claim 9 wherein the pool of networking devices reserved for the sandbox testing step does not include the dedicated networking device assigned to the disaster VDC.

17. A programmable computer product for providing disaster recovery and sandbox testing of a production data processing environment, the production environment comprising two or more data processors to be replicated, the program product comprising one or more data processing machines that retrieve instructions from one or more stored media and execute the instructions, the instructions for:
(a) replicating the production system with a disaster virtual data center (VDC) including at least one live virtual machine (VM) having a secure connection through at least one networking device dedicated to the disaster VDC, and a first dormant VM definition, for storing replicated data received from the production system while the production system is in operation;
(b) maintaining a test virtual data center (VDC) definition including at least a second dormant VM definition;
(c) recovering from a disaster event by activating the disaster VDC for access by the replication service customer in place of the production system by promoting the first dormant VM definition to a live VM when the production system fails; and
(d) testing recovery of the production system in a sandbox by:
(i) moving or copying the first dormant VM from the first dormant to the second dormant VM in the test VDC;
(ii) promoting the second dormant VM to a live VM within the test VDC;
(iii) allocating a networking device on demand from a pool of networking devices reserved for sandbox testing;
(iv) activating the test VDC for access while the production system is still operating; and
(v) releasing the networking device to the pool when the sandbox testing step is finished.

* * * * *

UNITED STATES PATENT AND TRADEMARK OFFICE
CERTIFICATE OF CORRECTION

PATENT NO. : 8,700,946 B2  Page 1 of 1
APPLICATION NO. : 13/283173
DATED : April 15, 2014
INVENTOR(S) : Chandra Reddy et al.

It is certified that error appears in the above-identified patent and that said Letters Patent is hereby corrected as shown below:

In the Specification:
Col. 3, line 2 should read:
~~services but pooled for is test VDCs.~~
services but pooled for test VDCs.

In the Claims:
Claim 13, Col. 11, line 4 should read:
~~step further includes testing to at least one of a production~~
step further includes testing at least one of a production Signed and Sealed this
Twenty-second Day of July, 2014

Michelle K. Lee
*Deputy Director of the United States Patent and Trademark Office*